(12) United States Patent
Robinson

(10) Patent No.: US 9,151,678 B2
(45) Date of Patent: Oct. 6, 2015

(54) SENSOR SHIELD

(71) Applicant: Bruce R. Robinson, San Dia Park, NM (US)

(72) Inventor: Bruce R. Robinson, San Dia Park, NM (US)

(*) Notice: Subject to any disclaimer, the term of this patent is extended or adjusted under 35 U.S.C. 154(b) by 52 days.

(21) Appl. No.: 13/868,567

(22) Filed: Apr. 23, 2013

(65) Prior Publication Data

US 2014/0311349 A1    Oct. 23, 2014

(51) Int. Cl.
*G01K 1/08* (2006.01)
*B01D 46/00* (2006.01)
*G01W 1/00* (2006.01)

(52) U.S. Cl.
CPC .............. *G01K 1/08* (2013.01); *B01D 46/0012* (2013.01); *G01W 1/00* (2013.01); *Y10T 29/49826* (2015.01)

(58) Field of Classification Search
CPC .......... B01D 45/12; B01D 45/16; B04C 3/00; G01N 25/00; G01N 25/14; G01K 1/08; G01K 1/12; G01K 2205/04
USPC ........ 55/385.1, 423, 471, 473, 447, 458, 462; 95/267; 73/170.16, 170.17, 170.26, 73/170.27
See application file for complete search history.

(56) References Cited

U.S. PATENT DOCUMENTS

| | | | | |
|---|---|---|---|---|
| 3,531,991 A * | 10/1970 | Strong et al. | ................... | 374/109 |
| 3,589,169 A * | 6/1971 | Lafitte et al. | .................. | 73/25.01 |
| 3,592,055 A * | 7/1971 | Dorman | ...................... | 73/170.16 |
| 3,813,854 A * | 6/1974 | Hortman | ........................ | 55/399 |
| 4,881,822 A * | 11/1989 | Ridenour | ....................... | 374/109 |
| 4,953,986 A * | 9/1990 | Olson et al. | .................... | 374/136 |
| 5,006,246 A * | 4/1991 | Edwards et al. | .............. | 210/264 |
| 5,168,240 A * | 12/1992 | Howe | ............................. | 324/690 |
| 5,533,390 A * | 7/1996 | Jones | ......................... | 73/170.16 |
| 5,570,744 A * | 11/1996 | Weingarten et al. | .......... | 166/357 |
| 5,591,907 A | 1/1997 | Stein et al. | | |
| 5,873,835 A * | 2/1999 | Hastings et al. | .............. | 600/488 |
| 6,247,360 B1 | 6/2001 | Anderson | | |
| 7,673,660 B2 * | 3/2010 | McNaughton | ................ | 141/251 |
| 7,883,570 B2 * | 2/2011 | Obrejanu | ........................ | 95/261 |
| 8,182,758 B2 * | 5/2012 | Oliveira et al. | ............... | 422/232 |
| 8,286,805 B2 * | 10/2012 | Hopper | ........................ | 210/512.1 |
| 8,556,082 B2 * | 10/2013 | Maynard et al. | .............. | 209/298 |
| 8,657,907 B2 * | 2/2014 | Meusel et al. | .................. | 55/405 |
| 8,706,320 B2 * | 4/2014 | Kelm | ................................ | 701/3 |
| 2004/0112117 A1 * | 6/2004 | Wright et al. | ................ | 73/25.01 |
| 2006/0243027 A1 * | 11/2006 | Nelson et al. | ................ | 73/23.31 |
| 2007/0277590 A1 | 12/2007 | Wilde | | |
| 2008/0006155 A1 * | 1/2008 | Sellers et al. | ................... | 95/282 |

(Continued)

FOREIGN PATENT DOCUMENTS

GB    2 175 693 A    12/1986

OTHER PUBLICATIONS

Radiation Shield 073B and 5980, Met One Instruments, Inc., 1600 Washington Blvd., Grants Pass, OR 97526, Rev. Dec. 2010, (one (1) page).

(Continued)

*Primary Examiner* — Duane Smith
*Assistant Examiner* — Minh-Chau Pham
(74) *Attorney, Agent, or Firm* — Iandiorio Teska & Coleman, LLP

(57) ABSTRACT

A shielded sensor system and method features an airflow housing including a downward facing inlet and a downward facing outlet. At least one sensor is disposed in the housing between the inlet and the outlet. A particulate screener is located between the inlet and the sensor.

25 Claims, 8 Drawing Sheets

(56) References Cited

U.S. PATENT DOCUMENTS

| | | | |
|---|---|---|---|
| 2008/0006250 A1* | 1/2008 | Bula et al. | 123/559.1 |
| 2011/0083558 A1* | 4/2011 | Van Der Vaart | 95/270 |
| 2011/0107732 A1* | 5/2011 | Schildermans et al. | 55/482.1 |
| 2011/0173934 A1* | 7/2011 | Burns et al. | 55/307 |
| 2011/0173936 A1* | 7/2011 | Burns et al. | 55/411 |
| 2011/0252757 A1* | 10/2011 | Olson et al. | 55/486 |
| 2012/0247074 A1* | 10/2012 | Chmayssani et al. | 55/419 |
| 2013/0104646 A1* | 5/2013 | Dolce | 73/170.27 |
| 2013/0319239 A1* | 12/2013 | Takenaka et al. | 95/267 |
| 2014/0260693 A1* | 9/2014 | Ewing et al. | 73/863.23 |

OTHER PUBLICATIONS

Fan Aspirated Radiation Shield 076B, Met One Instruments, Inc., 1600 Washington Blvd., Grants Pass, OR 97526, Rev. Dec. 2010, (two (2) pages).

Written Opinion of the International Searching Authority for Int'l. Application No. PCT/US2014/033955 mailed Aug. 28, 2014, five (5) pgs.

* cited by examiner

SENSOR SHIELD

FIELD OF THE INVENTION

This invention relates to sensor shields, in one example, for a weather station with temperature probes.

BACKGROUND OF THE INVENTION

Weather stations typically include one or more sensors in a housing protected by shielding. Met One Instruments (Grants Pass, Oreg.) sells radiation shields including an aspirated radiation shield for temperature and humidity sensors. U.S. Pat. No. 6,247,360, incorporated herein by this reference, discloses an aspirated radiation shield for weather sensors. See also U.S. Pat. No. 5,591,907 incorporated herein by this reference.

The measurement of ambient air temperature can be erroneously effected by solar radiation impinging on a temperature measurement probe, contamination of the probe by dirt, frost and moisture, and by ambient wind modifying the airflow over the measurement probe. Present shields, even aspirated shields, may still produce erroneous results when fan motors fail; when dirt, frost, or moisture collects on the temperature probes; or when high winds create a Bernoulli Effect vacuum that substantially reduces the airflow into the shield and hence over the temperature measurement probe.

SUMMARY OF THE INVENTION

Provided is a novel aspirated shield for use in a high accuracy ambient air temperature measurements. One example of a shield provides clean consistent and reliable airflow over the temperature measurement probes to accurately represent the ambient air temperature in various environmental conditions.

A low cost PVC conduit can be used to house all the components necessary to take accurate measurements of ambient air temperature. The shield can be easily assembled and disassembled for cleaning and part replacement. 3D printed parts can be used and adapted for most temperature probes and to control the airflow over the sensors and through the surrounding radiation isolation chambers.

In one example, three concentric tubes are provided with air flowing between the outermost tubes to isolate the temperature probe from radiation and precipitation and the inner most tube to draw air samples across the temperature measurement probes. A small double helix in the inner air sampling tube in conjunction with the replaceable wire screen cylinder functions to remove dirt and other contaminants from the airflow prior to impinging on the temperature measurement probes. One benefit of this design is that it removes contamination upstream of the fans used to control the airflow and thereby extends the useful life of the fan or fans.

A 3D printed flange adapts to a number of different probes geometries and can be designed in a manner that maintains the balance of airflow between the outer isolation chambers and the air sample chamber.

In one embodiment, a fan motor control board monitors the airflow and automatically adjusts the fan speed and the number of fans used to maintain the requisite airflow for accurate sampling and radiation isolation. When the airflow falls below a predetermined threshold either because of inlet/outlet blockage or for other reasons, a controller automatically adjusts the backup fan or increases the fan speed. Furthermore, the controller is responsive to an ambient light sensor and thus functions to decrease the number of fans in operation at night for power conservation when solar radiation has no effect on the temperature measurement.

One preferred design is water tight with both the inlet and outlet facing downward in direction. By having the inlet and outlet of the same size and facing downward, the Bernoulli Effect of wind flowing over the orifices and creating a vacuum that reduces airflow over the sensor is cancelled.

Featured is a shielded sensor system comprising an airflow housing including, a downward facing inlet and a downward facing outlet. At least one sensor in the housing is disposed between the inlet and the outlet. A particulate screener is located between the inlet and the sensor. One particulate screener includes a helix in the housing disposed to swirl the airflow and a wire screen cylinder downstream of the helix for capturing particulates. In some examples, the helix and wire screen cylinder are within a first conduit disposed within a second conduit itself disposed in the housing. Preferably, the sensor includes at least one temperature probe in the first conduit.

The temperature probe may be mounted to a flange mounted to the first and second conduits. In one design, the flange includes orifices therethrough for airflow in the first and second conduits. The flange is fabricated to mount different sensor configurations and the orifices are designed based on the sensor configuration. The housing preferably includes a first vertical section extending upward from the inlet and the sensor probe is then usually disposed in the first vertical section. The housing may further include a second vertical section extending upward from the outlet and a horizontal section between the first and second vertical sections. Preferably, the inlet and outlet are the same or approximately the same size.

The system may further include at least a first radiation shield proximate the inlet such as a plate with holes therethrough. A second radiation shield may be located upstream and spaced from the first radiation shield. In one design, the second radiation shield includes a plate behind the holes in the first radiation shield.

In some designs, the system further includes at least one fan upstream of the sensor and there may be at least two fans upstream of the sensor. Preferably, a controller is configured to control the operation of said fan. In one example, an airflow sensor and/or a light sensor provide an output to the controller and the controller is configured to control the fan(s) based on the output of the airflow sensor and/or the light sensor.

Also featured is an airflow housing including an inlet and an outlet, a helix in the housing disposed to swirl the airflow entering the inlet, a screen downstream of the helix for capturing particulates, and at least one sensor in the housing downstream of the screen. Preferably, the inlet is downward facing and the housing further includes a downward facing outlet the same size or approximately the same size as the downward facing inlet.

Also featured is a sensor shield manufacturing method comprising constructing a housing to include a downward facing inlet and a downward facing outlet, disposing a sensor in the housing between the inlet and the outlet, and disposing a particulate screener between the inlet and the sensor. Disposing a particulate screener in the housing may include disposing a helix in the housing behind a wire screen for capturing particulates in the swirl of airflow caused by the helix.

Also featured is a method constructing of a sensor shield comprising constructing an airflow housing to include an inlet and an outlet, disposing at least one sensor in the housing between the inlet and the outlet, disposing a helix in the housing for swirling airflow entering the housing inlet, and disposing a screen downstream of the helix for capturing particulates before they contaminate the sensor.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
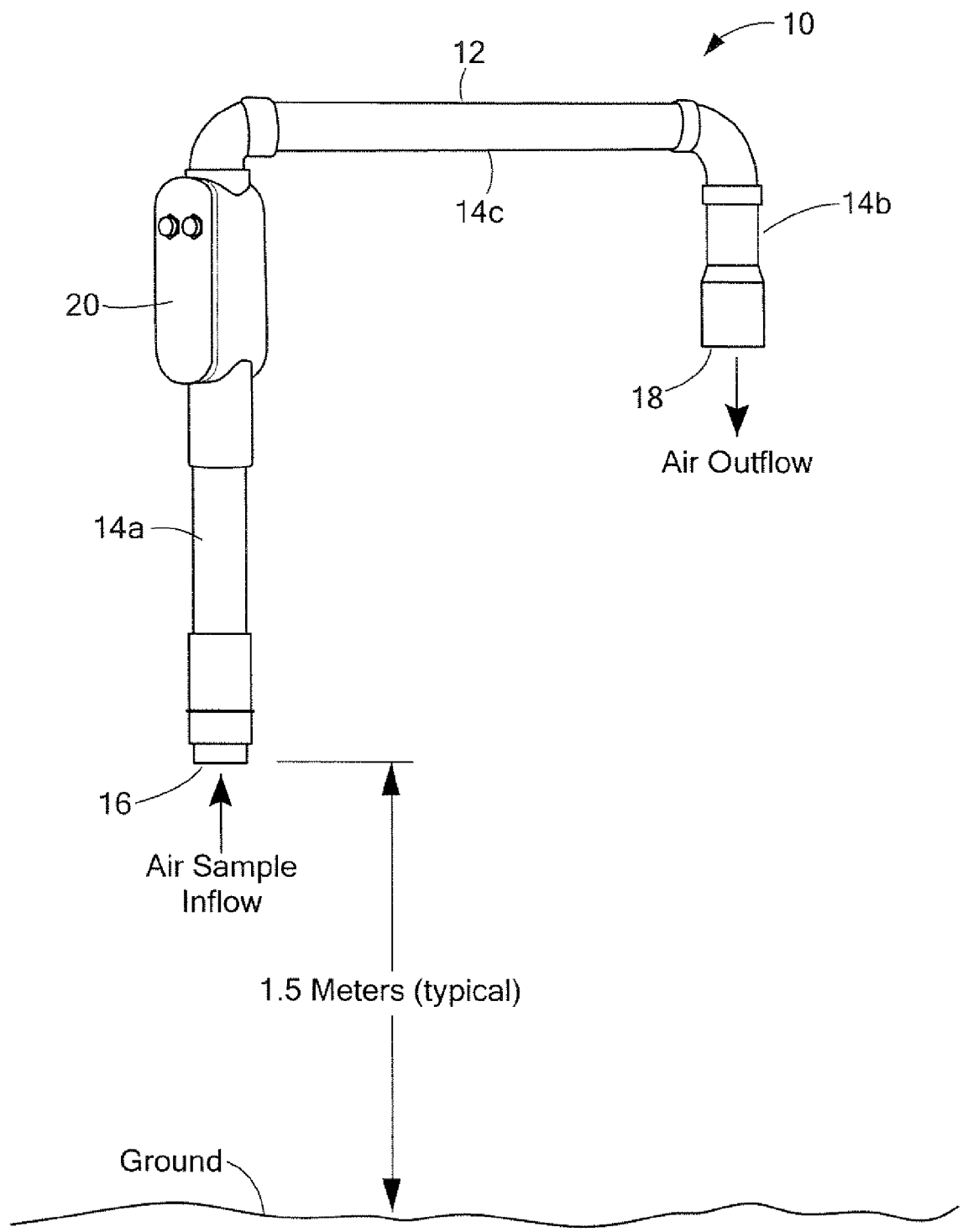
FIG. 1 is schematic three dimensional front view of the sensor shield in accordance with one example of the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
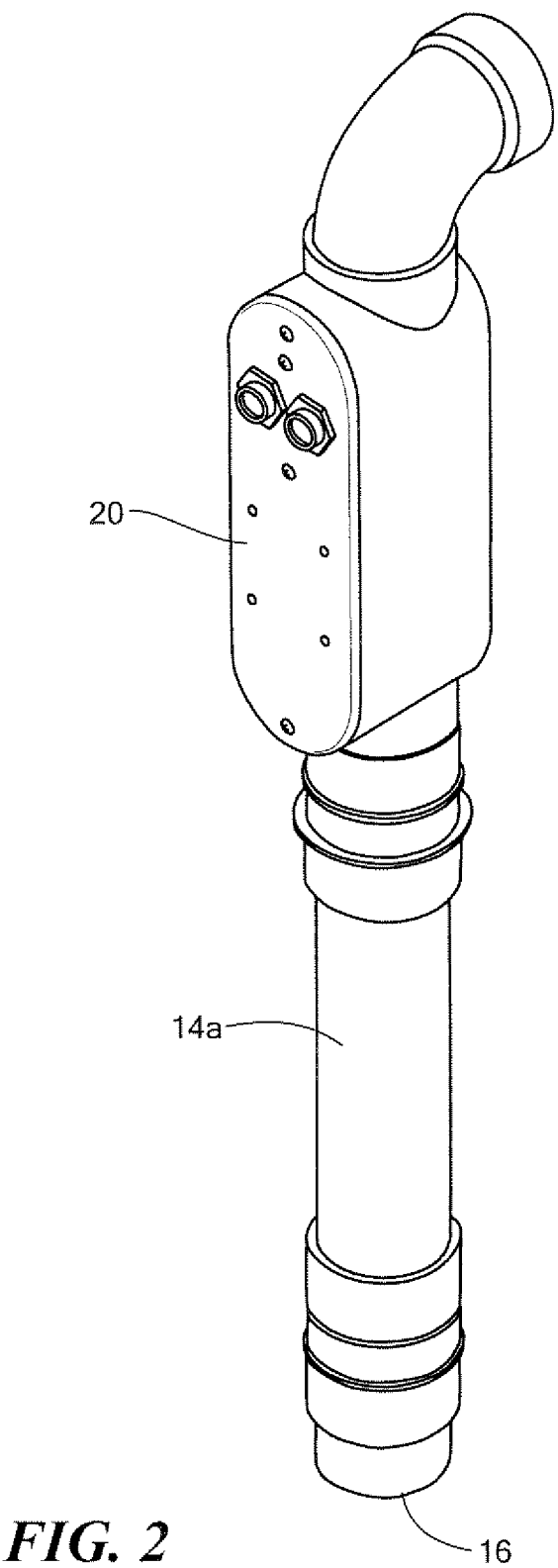
FIG. 2 is a schematic three dimensional view showing the sample inlet and the vertical housing section of the shield of FIG. 1.

FIGS. 1-2 show an example of a sensor shield 10 in accordance with the invention including housing 12 made of PVC tubing (e.g., two inches in diameter) configured with vertical section 14a defining downward facing airflow inlet 16 (e.g., two inches in diameter). Second vertical section 14b defines airflow outlet 18 (also, for example, two inches in diameter). Between vertical sections 14a and 14b is a horizontal section 14c. Inlet 16 is typically 1.5 meters from the ground level as shown and the shield may be retained in place via a support structure (not shown). Typically, the airflow inlet 16 and the airflow outlet 18 are oriented perpendicularly or nearly perpendicularly to the ground. Vertical section 14a may include junction box 20 for various circuitry, sensors, fans, and the like.

Figure 3:
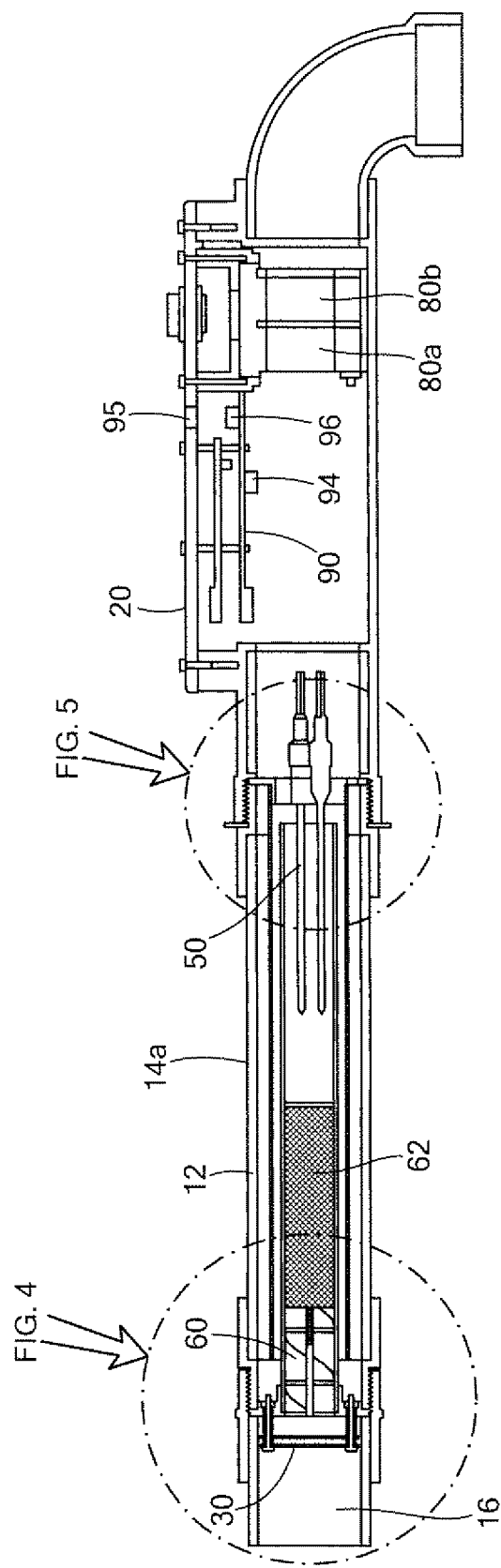
FIG. 3 is cross-sectional view of the housing section shown in FIG. 2.
Figure 4:
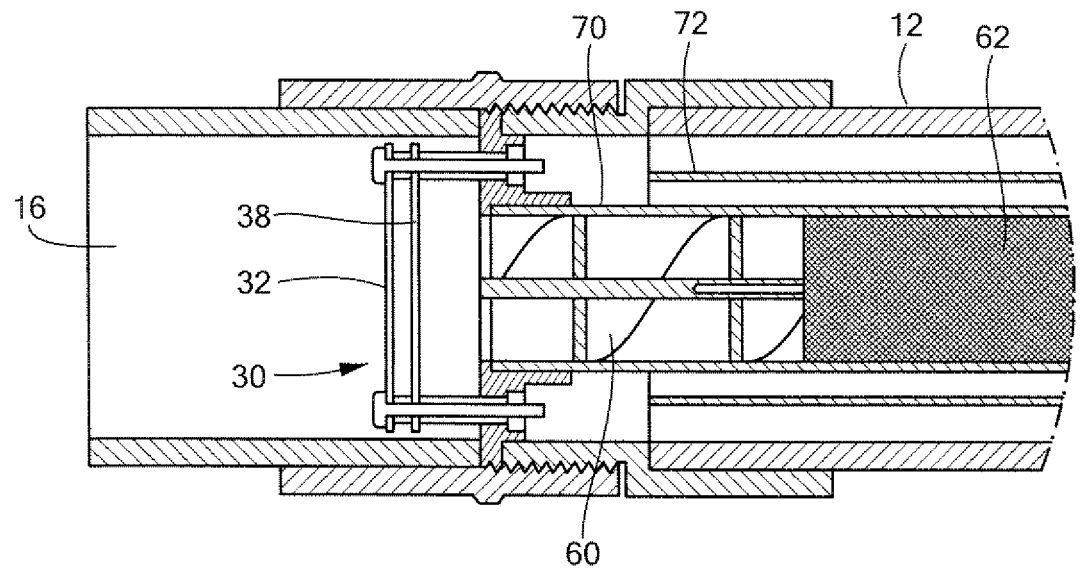
FIG. 4 is a more detailed schematic cross-sectional view showing the inlet portion of the housing section of FIG. 3.
Figure 6:
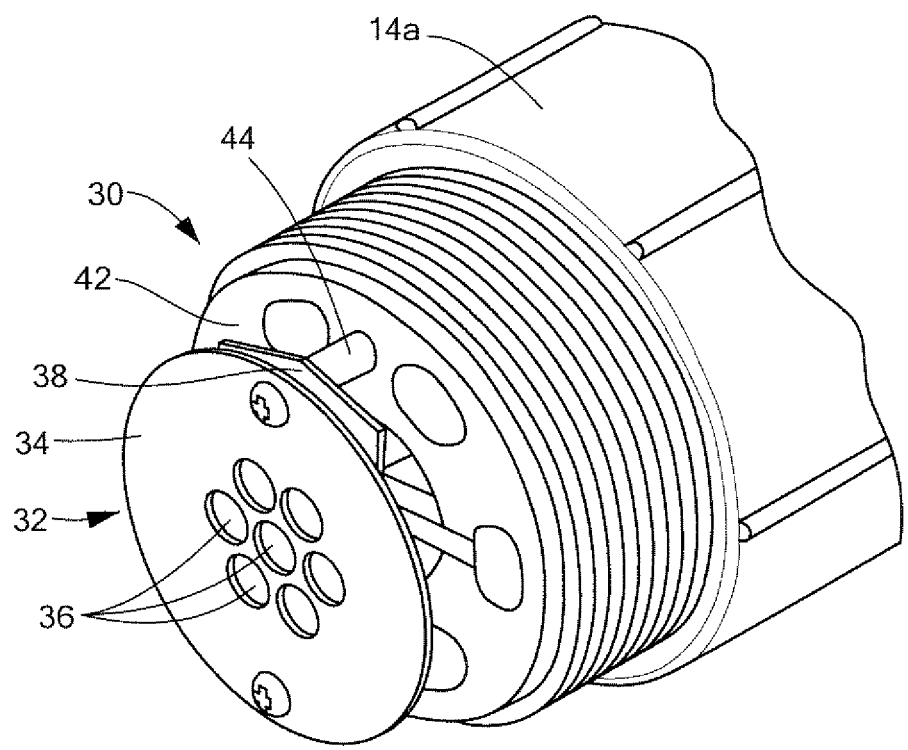
FIG. 6 is a three dimensional schematic view showing the radiation shield subassembly of FIGS. 3 and 4.
Figure 7:
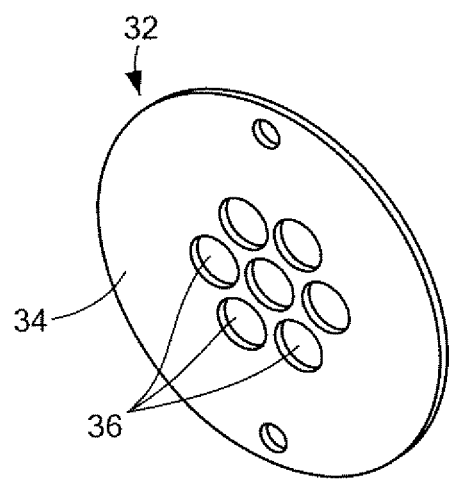
FIG. 7 is a schematic three dimensional front view showing a radiation shield as depicted in FIG. 6.
Figure 8:
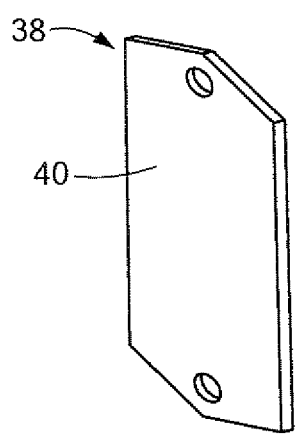
FIG. 8 is schematic three dimensional front view of the second radiation shield of FIG. 6.
Figure 9:
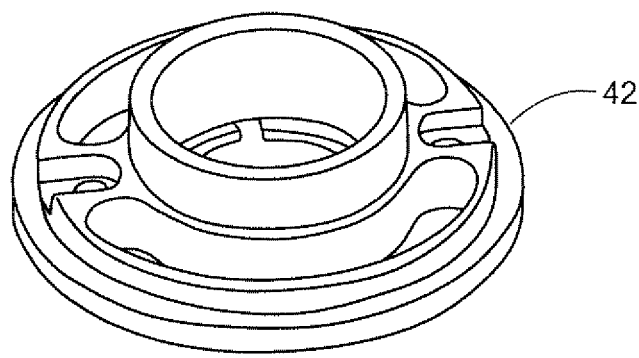
FIG. 9 is schematic three dimensional top view of a flange used in connection with the radiation shielding subassembly of FIG. 6.

Proximate inlet 16, FIGS. 3, 4 and 6, is radiation shielding assembly 30 including first thermal radiation shield 32, a sheet metal plate 34, FIG. 7 with (for example, one quarter inch) holes 36 therethrough. Spaced behind and upstream of shield 32 is another radiation shield 38, (e.g., aluminum plate 40, FIG. 8). Bottom flange 42, FIGS. 6 and 9 also has airflow orifices therethrough and includes standoffs 44 for mounting the two radiation shields 32, 38 in series spaced apart from each other.

Figure 10:
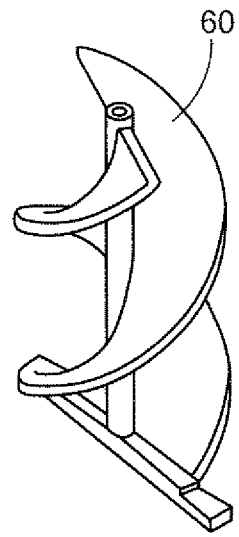
FIG. 10 is a schematic three dimensional front view of the double helix depicted in FIG. 4.

Upstream of the radiation shield assembly is a particulate screener between inlet 16 and temperature probe assembly 50. In one preferred embodiment shown, the particulate screener includes double helix member 60, FIGS. 3, 4, and 10 disposed in inner conduit 70 (e.g., a 1.0 inch diameter aluminum tubing component) itself disposed inside outer conduit 72 (e.g., 1.5 inches in diameter aluminum tubing) which is spaced from the inside of housing 12, FIGS. 3, 4, and 5.

Figure 13:
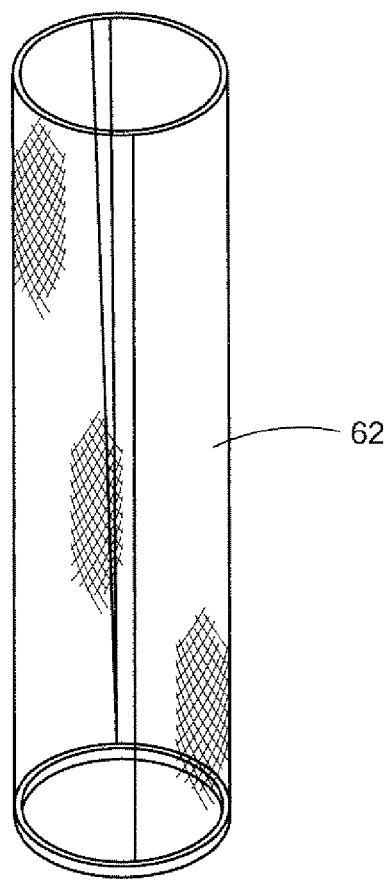
FIG. 13 is a schematic three dimensional front view of the wire screen cylinder shown in FIGS. 3 and 4.

Helix 60 functions to swirl the air flowing in conduit 70 and urges any particulate matter outward where it is captured by a screen such as wire screen cylinder 62, FIGS. 4 and 13, disposed inside inner conduit 70. Wire cylinder 62 may be 0.9 inches in diameter.

Figure 5:
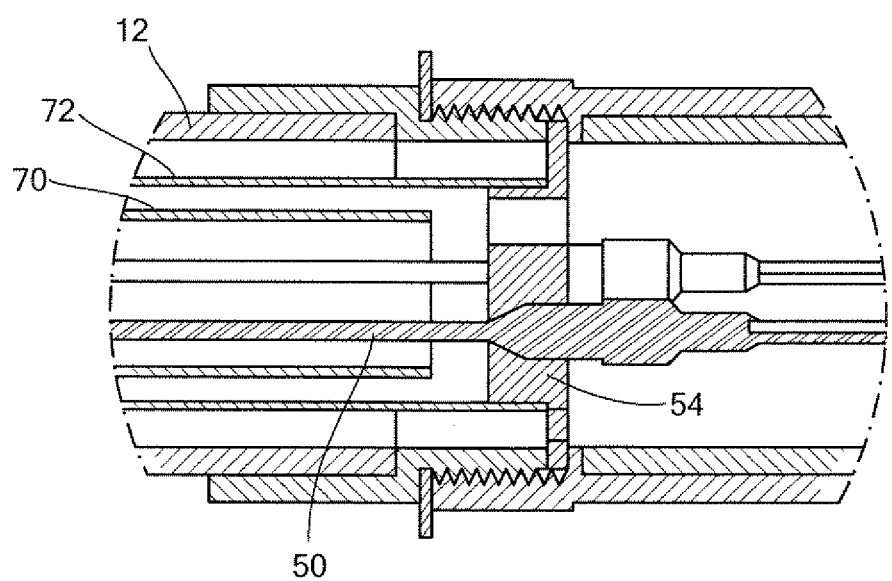
FIG. 5 is a schematic cross-sectional more detailed view of the probe fixture depicted in FIG. 3.
Figure 11:
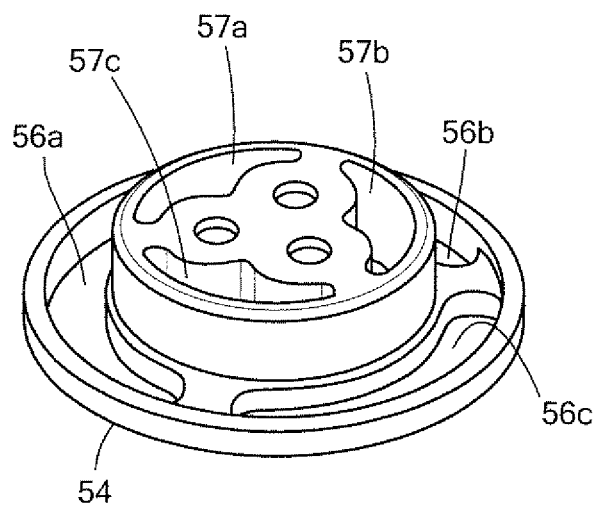
FIG. 11 is a schematic three dimensional top view of a probe flange in accordance with examples of the invention as shown in FIG. 5.
Figure 12:
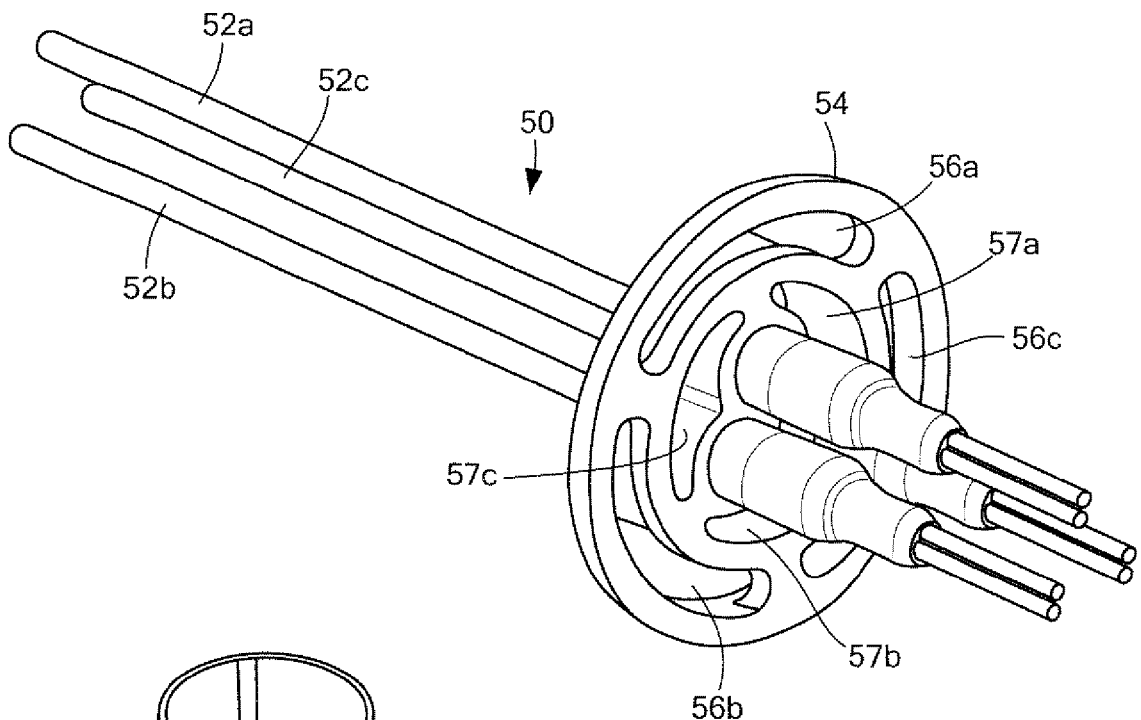
FIG. 12 is a schematic three dimensional view of a probe flange subassembly as shown in FIG. 5.

Temperature probe assembly 50, FIGS. 3, 5, and 12 is disposed upstream from screen 62 proximate junction box 20 and includes the temperature probes 52a, 52b, and 52c mounted within inner conduit 70 via probe flange 54, FIGS. 5, 11, and 12 mounted to inner and outer conduit 70, 72, best shown in FIG. 5. Flange 54 includes outer airflow orifices 56a, 56b, and 56c, FIG. 12, as well as inner airflow orifices 57a, 57b, and 57c, FIGS. 11-12. The probe flange may be fabricated using 3-D printing techniques to thus accommodate any sensor configuration. Once the sensor configuration is chosen, the airflow orifices in the probe flange are designed and configured for the appropriate airflow over the sensor(s).

Dual fans 80a and 80b, FIG. 3, provide redundancy and draw air into inlet 16 through helix 60, through inner conduit 70, and through the annulus between inner conduit 70 and outer conduit 72 and also through the annulus between outer conduit 72 and housing 12.

Figure 14:
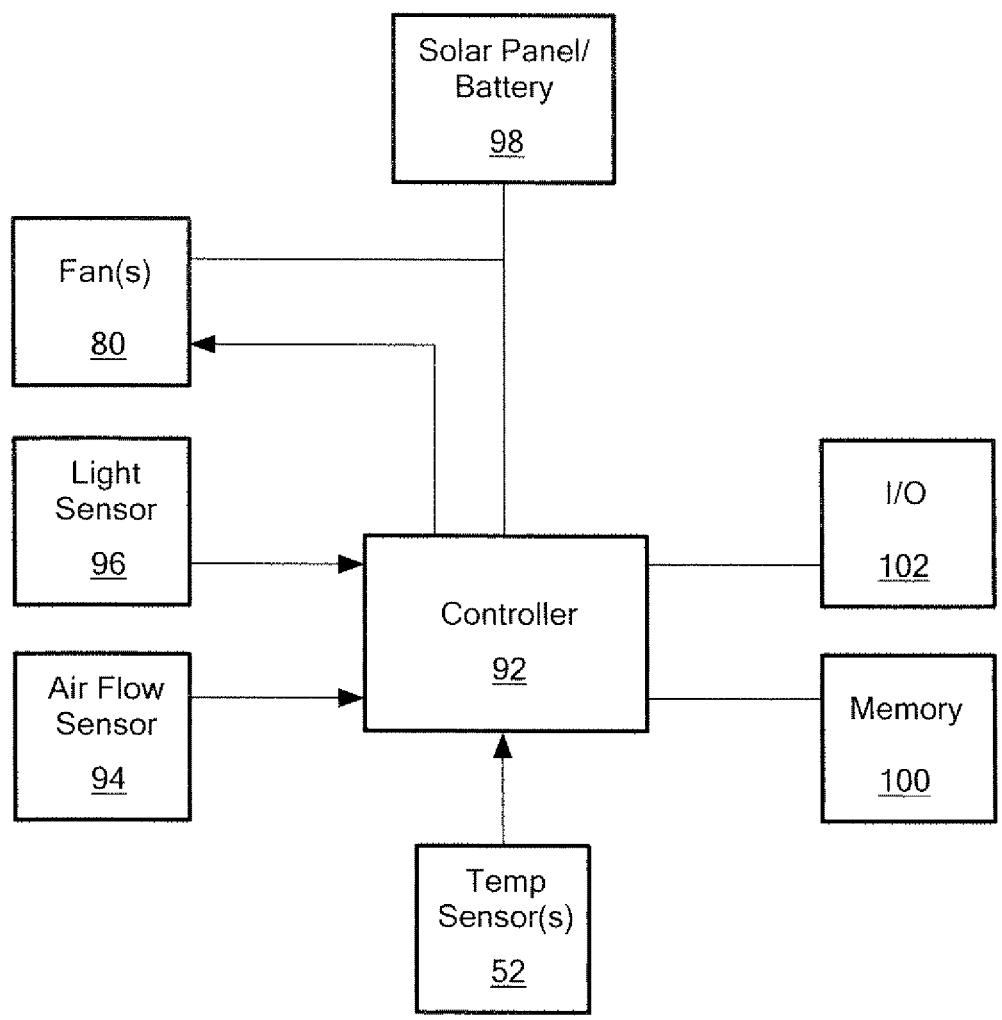
FIG. 14 is block diagram depicting several of the primary components associated with a complete probe shield in accordance with the invention.

Junction box 20, in this example, houses fans 80a and 80b and circuit board subassembly 90, FIG. 3 with a controller 92, FIG. 14, and one or more sensors such as airflow sensor 94 and light sensor 96 beneath window 95 in housing box 20. Power may be provided by a solar panel/rechargeable battery subsystem 98. Controller 92, which may be a microcontroller, microprocessor, application specific integrated circuit, field programmable gate array, or equivalent device or series of devices is preferably configured (e.g., programmed) to read the output of the temperature sensor(s) and store temperature values in memory 100 and/or to report the same via input output section 102 (e.g., a wireless transmitter. a port for connection to a smart device, a display, or the like). Controller 92 is also responsive to airflow sensor 94 and/or light sensor 96 and can be programmed to adjust the operation of a fan, to control fan speed, for example, or to switch each fan on and off individually (based on the airflow rate measured) to keep the airflow speed constant and/or to save battery power at night when light sensor 96 reports an ambient light level below a predetermined threshold.

In operation, the air sample inflow enters inlet 16, FIG. 1 and passes through and around the two part radiation shield shown best in FIG. 6. This radiation shield protects the sensors from direct ground radiation. The air sample then proceeds through the double helix 60, FIG. 4 and particulates are forced against wire screen 62 resting on top of the double helix. Removing particulates protects the temperature sensor and fans from contamination. The airflow then proceeds across the sensors 52 in FIG. 5 and through holes cut in probe flange 54, FIG. 11 and enters the electronic control and fan box 20, FIG. 3 along with airflow that has passed between the outer housing 12 and the two inner conduits 70, 72. Controlling the proportion of airflow across the temperature sensors is accomplished by adjusting the size of the openings allowing the airflow through the probe flange 54, FIG. 11. Adequate airflow over the sensors enables taking representative sample of air. Radiation shielding is enhanced.

Provided is a novel aspirated shield for use in high accuracy ambient air temperature measurement. One such shield will provide clean consistent and reliable airflow over the temperature measurement probes that accurately represents the ambient air temperature in all environmental conditions.

A low cost PVC conduit can be used to house all components necessary to take accurate measurements of ambient air temperature. It is easily assembled from off the shelf PVC parts that can also be easily disassembled for cleaning and part replacement. It further uses 3D printed parts to adapt most commonly used temperature probes to the configuration and to control airflow over the sensors and through the surrounding radiation isolation chambers.

Aspects of the invention use a design of three concentric tubes with air flowing between the outermost tubes to isolate the temperature probes from radiation and precipitation and the innermost tube to draw air samples across the probes. The small double helix part in the inner air sampling tube in conjunction with a replaceable wire screen cylinder removes dirt and other contaminants from the airflow prior to impinging on the probes. A further benefit of this design is that it removes contamination upstream of the fans used to control the airflow and thereby extends their useful life.

This design also uses an easily removable 3D printed flange that adapts to a number of different probe geometries and can be designed in a manner that maintains the balance of airflow between the outer isolations chambers and the air sample chamber. This design includes a fan motor control board that monitors the airflow and automatically adjusts fan speed and the operation of a number of fans to maintain the requisite airflow for accurate sampling and radiation isolation. Should airflow fall below a predetermined number, either because of inlet/outlet blockage or other reasons, the controller will automatically add the backup fan or increase fan speed. Furthermore, the fan control board contains an ambient light sensor that can be used to decrease the number of fans in operation at night for power conservation when solar radiation has no effect on the temperature measurement.

This design is water tight with both the inlet and outlet facing downward in direction. By having both the inlet and outlet of the same size and face downward, the Bernoulli Effect of wind flowing over the orifices and creating a vacuum that reduces airflow over the sensor is cancelled.

The airflow sensor mounted on the fan control printed circuit board senses the level of airflow and controls the speed and operation of the dual fans that draw air out of the chamber. The light detector attached to the top of the fan control board allows the fan power to be reduced when ambient light is diminished below a preset threshold to conserve power. The result is an accurate ambient air temperature measurement to the accuracy standards required by the US Government NOAA Climate Reference System.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A shielded sensor system comprising:
   an airflow housing including:
      a downward facing inlet,
      a downward facing outlet;
   at least one sensor in the housing between the inlet and the outlet; and
   a particulate screener between the inlet and the sensor.

2. The system of claim 1 in which the particulate screener includes a helix in the housing disposed to swirl the airflow and a wire screen cylinder downstream of the helix for capturing particulates.

3. The system of claim 2 in which the helix and wire screen cylinder are within a first conduit.

4. The system of claim 3 in which the first conduit is disposed within a second conduit disposed in the housing.

5. The system of claim 4 in which the sensor includes at least one temperature probe in the first conduit.

6. The system of claim 5 in which the temperature probe is mounted to a flange mounted to the first and second conduits.

7. The system of claim 6 in which the flange includes orifices therethrough for airflow in the first and second conduits.

8. The system of claim 7 in which the flange is fabricated to mount different sensor configurations and the orifices are fabricated based on the sensor configuration.

9. The system of claim 1 in which the housing includes a first vertical section extending upward from the inlet and the sensor is disposed in the first vertical section.

10. The system of claim 9 in which the housing further includes a second vertical section extending upward from the outlet.

11. The system of claim 10 in which the housing further includes a horizontal section between the first and second vertical sections.

12. The system of claim 1 in which the inlet and outlet are the same or approximately the same size.

13. The system of claim 1 further including at least a first radiation shield proximate the inlet.

14. The system of claim 13 in which the first radiation shield includes a plate with holes therethrough.

15. The system of claim 14 further including a second radiation shield upstream and spaced from the first radiation shield.

16. The system of claim 15 in which the second radiation shield includes a plate behind the holes in the first radiation shield.

17. The system of claim 1 further including at least one fan upstream of the sensor.

18. The system of claim 17 in which there are at least two fans upstream of the sensor.

19. The system of claim 17 further including a controller configured to control the operation of said fan.

20. The system of claim 19 further including an airflow sensor and/or a light sensor providing an output to the controller and wherein the controller is configured to control the fan based on the output of the airflow sensor and/or the light sensor.

21. A sensor shield manufacturing method comprising:
constructing a housing to include a downward facing inlet and a downward facing outlet;
disposing a sensor in the housing between the inlet and the outlet; and
disposing a particulate screener between the inlet and the sensor.

22. The method of claim 21 in which disposing a particulate screener in the housing includes disposing a helix in the housing behind a screen for capturing particulates in the swirl of airflow caused by the helix.

23. A shielded sensor system comprising:
an airflow housing including first and second vertical sections and a horizontal section therebetween,
the first vertical section defining a downward facing inlet oriented perpendicularly or nearly perpendicularly to the ground,
the second vertical section defining a downward facing outlet oriented perpendicularly or nearly perpendicularly to the ground;
at least one sensor in the first vertical section of the housing between the inlet and the outlet; and
a particulate screener between the inlet and the sensor.

24. A shielded sensor system comprising:
an airflow housing including:
a first vertical section and a second vertical section,
the first vertical section defining a downward facing inlet,
the second vertical section defining a downward facing outlet, and
a section between the first vertical section and the second vertical section separating the first vertical section from the second vertical section;
at least one sensor in the first vertical section of the housing between the inlet and the outlet; and
a particulate screener between the inlet and the sensor.

25. The system of claim 24 in which the section between the first vertical section and the second vertical section is horizontal.

\* \* \* \* \*